United States Patent [19]

Sato

[11] 4,364,312
[45] Dec. 21, 1982

[54] BAR CODE PRINTING DEVICE

[75] Inventor: Yo Sato, Tokyo, Japan

[73] Assignee: Kabushiki Kaisha Sato, Japan

[21] Appl. No.: 186,916

[22] Filed: Sep. 15, 1980

[30] Foreign Application Priority Data

Oct. 8, 1979 [JP] Japan ................................. 54-138350

[51] Int. Cl.$^3$ ............................................... B41K 1/12
[52] U.S. Cl. ...................................... 101/110; 101/45
[58] Field of Search ......................... 101/110, 111, 45

[56] References Cited

U.S. PATENT DOCUMENTS

| | | | |
|---|---|---|---|
| 3,508,488 | 4/1970 | Manl et al. ............................. | 101/45 |
| 3,515,060 | 6/1970 | Barbour ................................. | 101/45 |
| 3,722,405 | 3/1973 | Mahoney et al. ..................... | 101/45 |
| 3,828,667 | 8/1974 | Davis et al. ........................... | 101/66 |
| 3,865,026 | 2/1975 | Tront ..................................... | 101/45 |
| 4,018,157 | 4/1977 | Sato ..................................... | 101/110 |
| 4,055,118 | 10/1977 | Sato ..................................... | 101/111 |
| 4,056,054 | 11/1977 | Feldman ................................ | 101/45 |
| 4,084,507 | 4/1978 | Sato ..................................... | 101/111 |
| 4,149,460 | 4/1979 | Sato ..................................... | 101/110 |
| 4,155,302 | 5/1979 | Sato ..................................... | 101/110 |

*Primary Examiner*—William Pieprz
*Attorney, Agent, or Firm*—Ostrolenk, Faber, Gerb & Soffen

[57] ABSTRACT

Herein disclosed is a printing device for printing bar codes, or the like. The printing device includes a printing head which is adapted to be received in the body of the printing device for printing and which can be removed for selecting the bar codes to be printed. The printing head includes a plurality of bar code type rings axially aligned with one another such that they can be manually separated axially so that they can rotate independently of one another for selecting the bar code to be printed. The bar code type rings are moved together for printing. Separation of the type rings causes a stopper to protrude out of the casing of the printing head to engage the frame of the printing device in such a manner as to prevent substantial movement of the printing head, such movement being a necessary part of the printing operation. Bringing the type rings together to their printing position retracts the stopper, which permits printing movement of the printing head.

9 Claims, 9 Drawing Figures

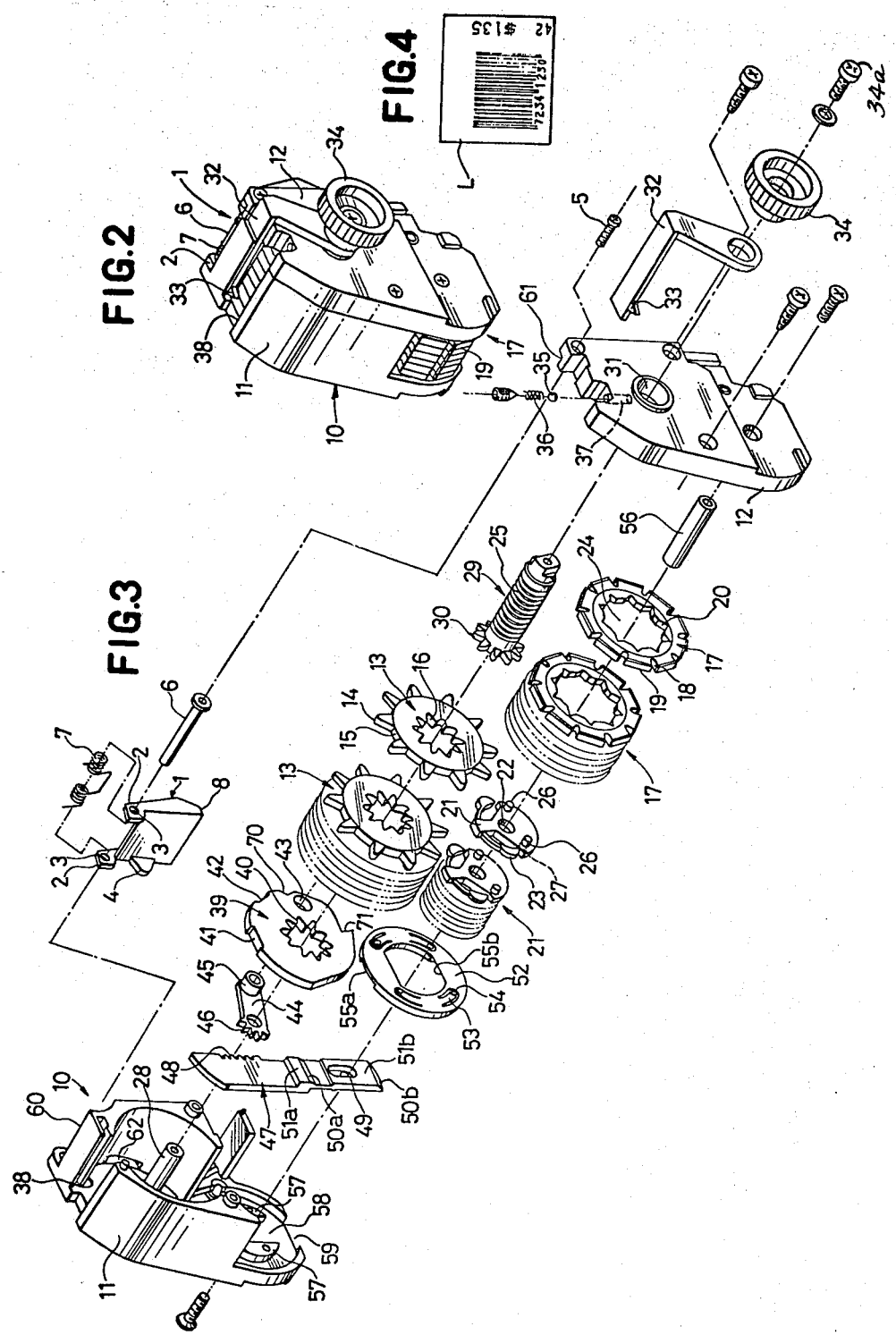

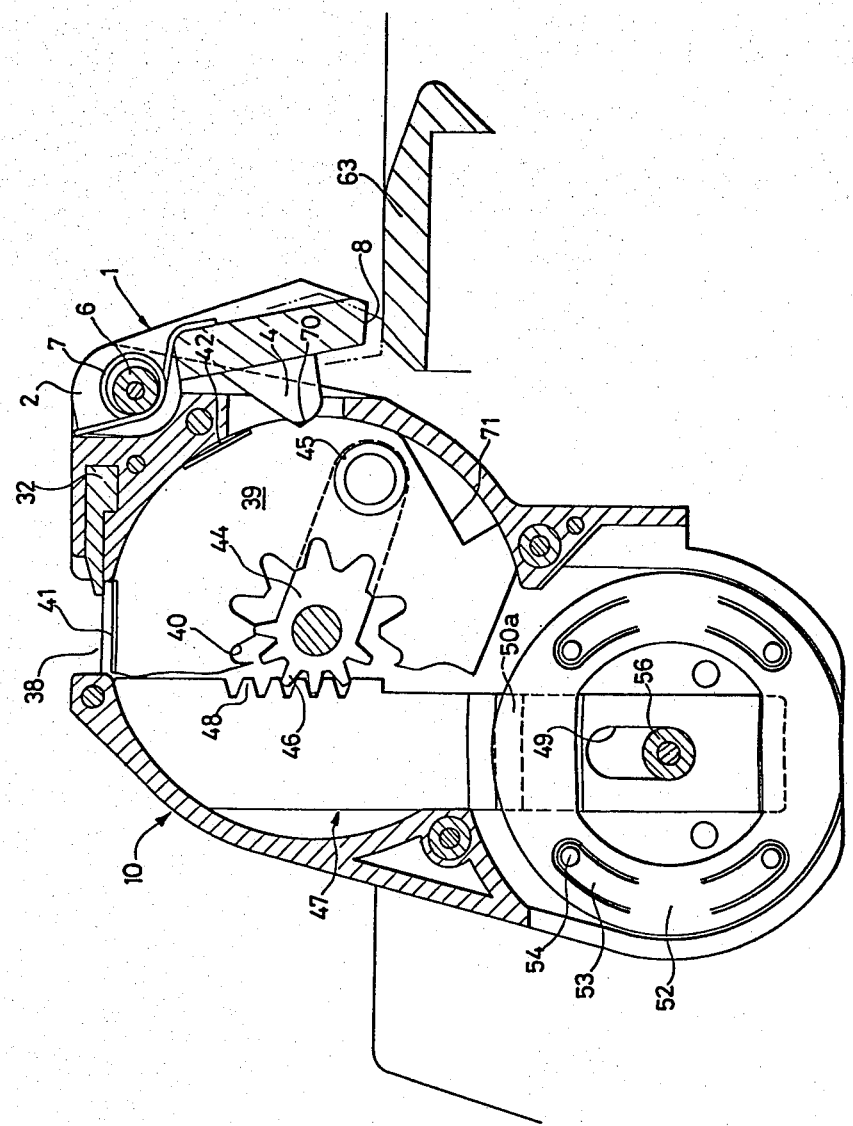

BAR CODE PRINTING DEVICE

BACKGROUND OF THE INVENTION

1. Field of the Invention

The present invention relates to a printing device for printing bar codes that can be read automatically from all directions by means of an optical reader. More particularly, the present invention relates to improvements in a bar code printing device which is used with a portable label printing and applying machine or a table type automatic label printing machine for printing labels or tags with bar codes. See, for example, the following U.S. Patents and Applications of the inventor hereof: Ser. No. 158,320, filed Jun 10, 1980; U.S. Pat. Nos. 4,084,507; 4,018,157; and also U.S. Pat. Nos. 4,155,302; 4,149,460 and 4,055,118.

2. Description of the Prior Art

In large supermarkets, recently, the POS (Point-Of-Sale) system using a computer has been put into practice. In one standard type of POS bar code, as shown in FIG. 4 of the accompanying drawings, each numeral is composed of one character, comprising two dark bars having a length of 14 mm and two light spaces arranged parallel to and next to each other. The character thus composed has a width of 2.31 mm. A tolerance of $\pm 0.101$ mm is required.

A printing device for printing the bar code includes a plurality of bar code type rings, each of which includes a plurality of bar code types (representing the various numerals). Each bar code type is composed of the dark bars and light spaces having the standard sizes corresponding to each numeral. Even if the bar code type rings are accurately made, it is a problem to ensure the necessary accuracy in the size of the gaps between any two adjacent type rings arranged in alignment with one another. More specifically, since the width of each light space located at the end of each bar code symbol is significant in determining the value of the symbol, formation of extraneous gaps between the type rings will result in the optical reader reading the numeral incorrectly. If, on the other hand, the bar code type rings are fixed close together, it is impossible to selectively turn them independently of each other, as is necessary in setting the value of the number which is to be printed.

There has been proposed and used a bar code printing device of the type in which gaps are formed between the type rings in order to allow independent rotation thereof, thereby to facilitate the selection of the bar code symbols to be printed. The type rings are brought close together during printing operations, eliminating the gaps, so that widthwise printing errors of the type described above can be minimized.

During the use of the above described known device, however, it frequently occurs that the operator omits bringing the type rings close together after the type selecting operation and preparatory to the type printing operation, so that the printing operation is carried out with undesirably wide gaps between the type rings. The labels or tags printed while the printing device is in this condition are useless. In the event, moreover, that these labels or tags are erroneously applied to commodities, the result is that the optical reader fails to read out the correct information, which creates serious problems in the use of the POS system.

SUMMARY OF THE INVENTION

It is the object of the present invention to provide a bar code printing device that is free of the foregoing defects. This object is achieved by providing a device in which a flap-like stopper acts to prevent printing operations during a type selecting operation so that printing operations are always performed correctly.

The present invention provides a bar code printing device for a label printing machine or the like. There is a printing head adapted to be received in the body of the label printing machine. A plurality of bar code type rings are provided in the printing head and are axially aligned. The type rings are axially separable from each other to allow them to rotate independently of one another. A selecting shaft disposed in the printing head is adapted to be manually actuated to separate the bar code type rings from one another for type selecting operations and to bring the bar code type rings close together for printing, and the shaft is adapted to rotate each type ring independently to select the bar code symbol to be printed by that type ring. A flap-like stopper is provided, which is moved by the selecting shaft to a position in which it protrudes out of the casing of the printing head during type selecting operations in such a manner as to prevent printing as long as the stopper so protrudes.

Other objects and features of the present invention will be apparent from the following description and the accompanying drawings.

BRIEF DESCRIPTION OF THE DRAWINGS

FIG. 2 is a perspective view showing the exterior of a printing head according to the present invention.

FIG. 3 is an exploded perspective view of the printing head of FIG. 2.

FIG. 4 is a plan view showing a label piece that has been printed with numerals in a bar code.

DESCRIPTION OF THE PREFERRED EMBODIMENT

Figure 1:
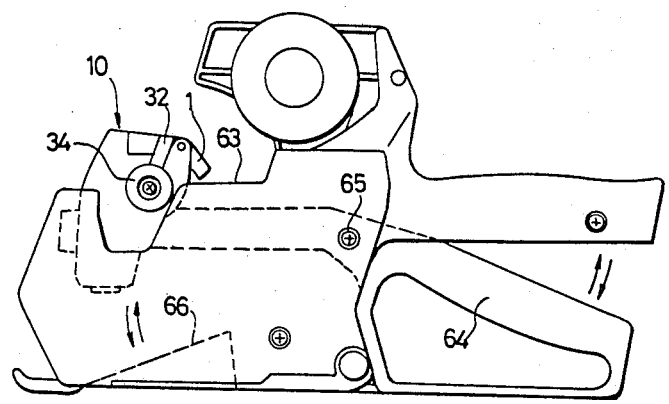
FIG. 1 is a side elevation showing a hand labeler equipped with a bar code printing device according to the present invention.

The present invention will now be described in more detail with reference to the accompanying drawings.

A bar code printing head 10 is constructed, as shown in FIGS. 2 and 3, to include a plurality of axially aligned bar code type rings 17 and another axially aligned plurality of index rings 13 which are juxtaposed to mesh with respective type rings 17. The group of type rings 17 and the group of index rings 13 are accommodated rotatably about respective axes within a space which is defined by a casing 11 and a cover frame 12.

Each of the index rings 13, which are disposed in the upper portion of the printing head 10, as formed on its outer circumference ten teeth 14 and ten index numerals 15 from 0 to 9. The index numerals 15 are each disposed between two adjacent teeth 14. Each index ring 13 also has a center hole that is defined and surrounded by internal teeth 16 which are to mesh with a selecting shaft 29 that will be described below.

The bar code type rings 17, which mesh with the index rings 13, are disposed in the lower portion of the printing head 10. Each type ring 17 has a plurality of engagement dents 18 formed on its outer circumferential surface, which are in meshing engagement with the external teeth 14 of a respective index ring 13, and also has a plurality of printing surfaces, which comprise bar code types 19 and which are each disposed between two adjacent engagement dents 18. The type ring 17 is formed in an equilateral decagonal shape, and the bar code types 19 occupy the respective sides of the decagonal shape. The types protrude from a bar code printing aperture 59 which is formed at the bottom of the printing head 10. The types 19 correspond to the index numerals 15 of the index ring 13 so that when a particular index numeral is selected on an index ring, the correponding type 19 is at the aperture 59. The bar code type ring 17 has a central opening therein that is formed with an defined by internal teeth 20 around its internal circumference. A corresponding pivot member 21 fixed on a main shaft 56 is received in this opening.

There are respective pivot members 21, for each of the bar code type rings 17. Each pivot member 21 is integrally formed with a pair of elastic engagement members 23 whose radially outward edges bulge for the purpose of providing elastic engagement with the internal teeth 20 on the inner circumference of the corresponding bar code type ring 17, thereby to angularly position the type ring 17.

Each of the pivot members 21 has a pair of studs 26 formed on one side and a pair of grooves 27 formed on its other side, the grooves 27 being shaped and positioned to correspond to and receive studs 26. The pivot members 21 are locked together to form an integral block by engagement between the studs 26 and the grooves 27. The main shaft 56 is screwed into the side frame of the casing 11 and into the cover frame 12 and is fixedly fitted in the center holes 22 which are formed at the center of the respective pivot members 21.

The cylindrical selecting shaft 29 is brought into engagement with a selected one of the grouped index rings 13 to selectively turn it. The selecting shaft 29 thus constructed is axially slidably fitted on a guide shaft 28 which is fixed to the casing 11 of the printing head 10. The selecting shaft 29 carries a pinion 30 on its leading end, which pinion 30 is engageable with the internal teeth 16 of a selected one of the index rings 13. The body of the selecting shaft 29 extends through a guide hole 31 in the cover frame 12 and carries an indicator 32, which is provided with an arrow 33 for indicating the index numeral 15 corresponding to one of the index rings 13. A selecting knob 34 is fixed to the trailing end of the selecting shaft 29 by means of a screw 34a.

Both the index numerals 15 on the index rings 13 and a cam member 39 that will be described below are visible through an index aperture 38, which is formed in the upper side of the printing head 10, for the subsequent operations.

Between the upper side and the guide hole 31 of the cover frame 12, there is formed a through hole 37 in which is accommodated a steel ball 35 which is biased toward guide hole 31 by means of a coil spring 36. The steel ball 35 is urged into the guide hole 31 until it engages with one of a plurality of annular grooves 25 which are formed on the outer circumference of the selecting shaft 29, thereby to axially position the selecting shaft 29.

The cam member 39 is arranged behind the group of index rings 13 and has a central opening therethrough that is formed with and defined by internal teeth 40 which are to mesh with the pinion 30 of the selecting shaft 29. The cam member 39 has the legend "Select" 41, the legend "Print" 42, a type selecting shallow groove 70 and a type printing deep groove 71 formed on its outer circumference in this order going around the cam member 39 clockwise as seen from the direction of selecting knob 34. As will be explained below, the type selecting shallow groove 70 and the type printing deep groove 71 correspond respectively to type selecting operations and to type printing operations.

An actuating arm 44 is fixed to one side of the cam member 39. Specifically, the actuating arm 44 has a ring 45 fitted in an actuating hole 43 of the cam member 39 and a pinion 46 formed at its leading end. Pinion 46 meshes with the rack 48 of an actuating member 47 which is vertically movable relative to the casing 11 of the printing head 10.

The actuating member 47 is arranged behind the group of bar code type rings 17 and has formed in its lower portion a slot 49 in which the main shaft 56 is loosely fitted. The actuating member 47 is also formed with slopes 50a and 50b and planar land surface 51a and 51b on its side facing the type rings 17. A thrust member 52 is sandwiched between the actuating member 47 and the bar code type rings 17. The thrust member 52 has one side formed with slopes 55a and 55b, which are shaped and positioned to correspond to the slopes 50a and 50b of the actuating member 47, and has its other side formed with a plurality of elastic flaps 53 which are punched out and which thrust against the group of type rings 17. For this purpose, the elastic flaps 53 are formed with projections 54 at their leading ends.

The actuating member 47 is received in a vertically slidable manner along a guide surface 58, which is the vertical space defined between bearing members 57 which are formed on the inner wall of the casing 11 and which have the shape of circular segments whose straight edges face each other. Thus, the bearing members 57 act as guide members for the actuating member 47.

The casing 11 and cover frame 12 are formed with notches 60 and 61 at their respective upper edges. The casing 11 is also formed with a slot 62 below one end of the notch 60. A stopper 1 has its upper edge rotatably attached to the opposed shoulders defined at the opposite ends of the notches 60 and 61.

The stopper 1 has a flap-like body and has two spaced apart arms 2 formed at its upper edge. A retaining projection 4 projects from one side of its inwardly facing wall. The arms 2 have holes 3 formed therein. The stopper 1 is rotatably attached to the upper corner of the printing head 10, i.e., to the shoulders at the ends of the notches 60 and 61, by means of a pin 6 which is inserted through the holes 3 and which is fastened in place between the shoulders at the casing 11 and the cover frame 12, respectively, by means of a fastening screw 5.

The lower portion of the stopper 1 is urged toward the printing head 10 by the action of a torsion spring 7 which is wound on the pin 6. As a result, the retaining projection 4 is received in the slot 62 of the casing 11 such that its leading edge abuts against the outer circumference of the cam member 39.

The bar code printing device according to the present invention is used in conjunction with a portable label printing and applying machine (which will be referred to hereinafter as a "hand labeler"), as shown in FIG. 1. The operation of this apparatus is now described.

Referring to FIG. 1, the hand labeler includes a stationary machine frame 63. An actuating lever 64, which carries the bar code printing head 10 at its leading (left hand) end, is attached to the machine frame 63 such that it is rotatable about a pivot pin 65. When the actuating lever 64 is squeezed, it moves the printing head 10 against the platen 66 to print a label, unless the printing operation is prevented by the stopper 1 in a manner that is described below. The labels are printed by the printing head 10 on the platen 66.

Figure 6:
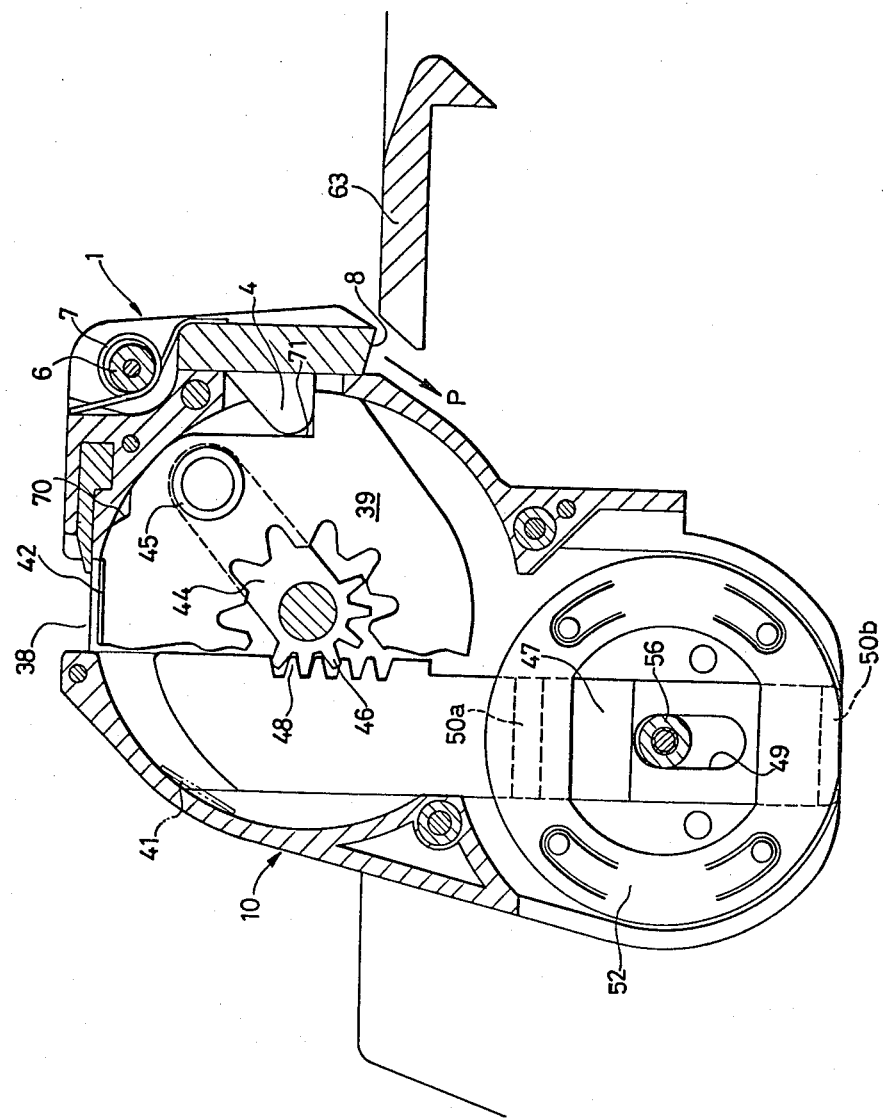
FIGS. 6(A) and (B) are sections taken along line VI—VI of FIG. 5 showing the printing head of FIG. 2 in position for type selecting and for printing operations, respectively.
Figure 7:
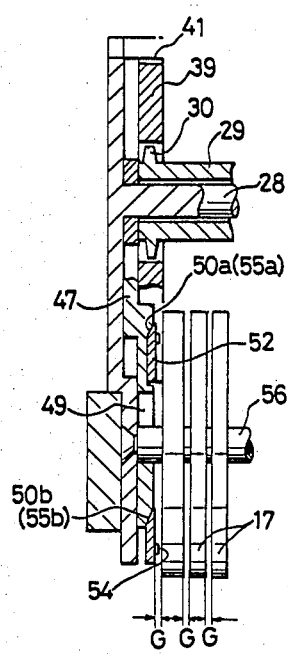
FIGS. 7(A) and (B) are longitudinal sections of a portion of the printing head of FIG. 2 during type selecting and printing operations, respectively.
Figure 7:
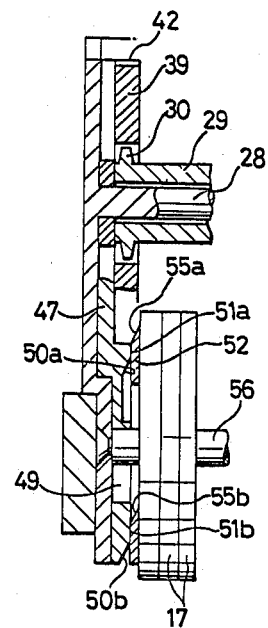

FIGS. 1, 6(A) and 7(A) show the printing device of the invention in a position in which the numerals whose bar code symbols are to be printed may be selected. The portion of the cam member 39 bearing the legend "Select" 41 appears at the top position, as seen with the printing device 10 upright, as in FIGS. 1, 6(A) and 7(A), so that that legend is visible through the index aperture 38. The retaining projection 4 of the stopper 1 is received in the type selecting shallow groove 70 formed in the outer circumference of the cam member 39. As a result, the body of the stopper 1 protrudes backward a considerable distance from the printing head, i.e. toward actuating lever 64 and pivot pin 65 (see FIG. 1). If the actuating lever 64 is squeezed for the purpose of moving the printing head 10 against the platen 66 to print a label, the lower edge 8 of the stopper 1 strikes the upper side of the machine frame 63 of the hand labeler, making it impossible to rotate the actuating lever 64 far enough about the pivot pin 65 to bring the printing head 10 against the platen 66. Thus, it is impossible to complete a printing operation while the numerals are being selected.

In the type selecting position shown in FIGS. 1, 6(A) and 7(A), moreover, since the actuating member 47 meshing with the pinion 46 of the actuating arm 44 is at its upper limit of movement, its slopes 50a and 50b are in registered engagement with the slopes 55a and 55b of the thrust member 52, as shown in FIG. 7(A). As a result, the thrust member 52 is not forced against the type rings 17 as it is in FIG. 7(B), so that gaps G are formed between each two adjacent type rings 17, allowing each type ring 17 to be freely rotated independently of the others. It is thus easy to rotate a single selected type ring 17 for the purpose of selecting the numeral whose bar code symbol is to be printed by that type ring 17.

The type rings 17 are set in the followin manner. The selecting knob 34 is pulled out axially from the body of the printing device 10 to select the bar code type ring 17 which is to be reset. The selecting knob 34 is then turned to selectively bring the desired bar code type 19 into the printing position in a smooth manner. To do this, the arrow 33 of the indicator 32, which moves simultaneously with and parallel to the axial movement of the selecting knob 34, is brought into alignment with the desired index numeral 15 of the index ring 13 corresponding to the type ring 17 to be reset. The desired bar code type 19 has been selected when the corresponding index numeral appears in the index aperture 38 at the position indicated by the arrow 33.

Figure 5:
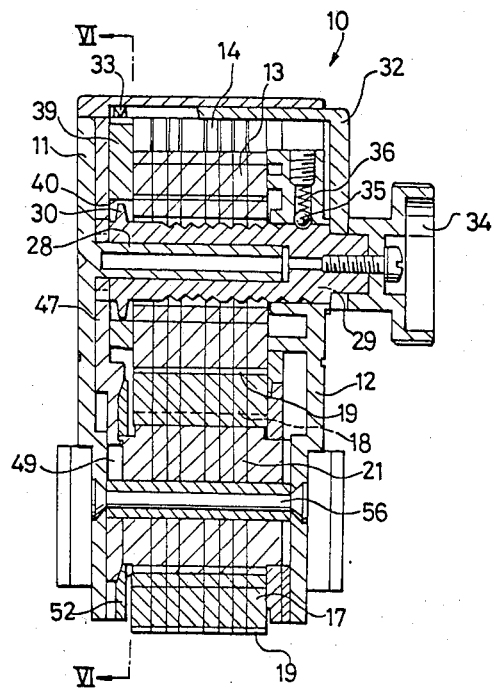
FIG. 5 is a longitudinal section showing the printing head of FIG. 2.

When the bar code types 19 have all been set as desired and a label is to be printed, the selecting knob 34 is pushed into the printing head 10 as far as possible, as shown in FIG. 5. It is then turned counterclockwise through a predetermined angle from the position shown in FIG. 6(A), until the respective bar code type rings 17 lock in a manner described below.

In response to the counterclockwise rotation of the selecting shaft 29, the actuating member 47 is pushed down by the cam member 39 and the actuating arm 44, as shown in FIGS. 6(B) and 7(B). As a result, the beveled surfaces or slopes 50a and 50b of the actuating member 47 slide over the beveled surfaces or slopes 55a and 55b of the thrust member 52 until the planar land surfaces 51a and 51b of the actuating member are brought into abutment with the side of the thrust member 52. This forces the projections 54, which are formed at the leading ends of the elastic flaps 53 of the thrust member 52, against the bar code type rings 17, as shown in FIG. 7(B). The elasticity of the elastic flaps 53 eliminates the gaps G, which existed during the resetting process, so that the type rings 17 are brought into close contact with one another, thus making the light spaces of the selected bar code accurate.

Through the counter-clockwise rotations of the cam member 39, the legend "Print" 42 becomes visible through the index aperture 38, as shown in FIG. 6(B), and the retaining projection 4 of the stopper 1 is received and held in the type printing deep groove 71 formed in the outer circumference of the cam member 39. As a result, the stopper 1 is turned clockwise by the action of the torsion spring 7 so that the amount by which it protrudes backward from the printing head 10 is accordingly reduced. Now, when the actuating lever 64 is squeezed to move the printing head 10 obliquely downward (in the direction of arrow P in FIG. 6(B)), the lower side 8 of the flap 1 does not strike the machine frame 63 of the hand labeler as the print head 10 is moved downward, whereby the printing operation proceeds unimpeded.

If it is desired to reset the type selections after printing, the cam member 39 is turned clockwise by means of the selecting knob 34 until the type selecting position shown in FIGS. 6(A) and 7(A) is obtained. The desired bar code types are then selected by the procedures described above.

In the embodiment described herein, the actuating arm 44 formed with the pinion 46 is sandwiched between the actuating arm 47 and the cam member 39, which is in meshing engagement with the pinion 30 of the selecting shaft 29. However, the present invention is not limited to the embodiment described and illustrated but can be modified by providing the cam member 39 with teeth which mesh directly with the rack 48 of the actuating member 47.

Those skilled in the art will also appreciate that the present invention can also be applied to a bar code printing device of the type in which the index numerals are disposed between each two adjacent bar code types on the outer circumference of the types rings, the index rings being dispensed with. See U.S. Pat. No. 4,155,302.

As will be understood from the foregoing description, the stopper 1 protrudes out of the casing of the printing head 10 far enough to strike the machine frame 63 as long as the machine is in the type selection or resetting position for preventing printing. As long as the machine is in the printing position, the stopper 1 is withdrawn far enough into the body of the printing head 10 so that it clears the machine frame 63 and therefore does not interfere with the printing operation. As a result, all danger of printing occurring during type selection, i.e.

while the gaps G are defined between adjacent type rings 17, is eliminated. Consequently, the printing operation is always accomplished properly, i.e. with the adjacent type rings 17 in close contact with each other. Thus, the present invention affords a great improvement in the efficiency of the printing of labels or tags.

The present invention may be embodied in other specific forms without departing from the spirit or essential attributes thereof, and, accordingly, reference should be made to the appended claims, rather than to the foregoing specification, as indicating the scope of the invention.

What is claimed is:

1. A printing device comprising:
   a machine frame; a printing head supported by said frame and movable with respect to said frame from a rest position to a printing head printing position for printing a set of selected symbols on a label; said printing head further comprising:
   a plurality of type rings for printing said selected symbols; each said type ring being generally circular in shape and having a plurality of type heads formed thereon corresponding to respective ones of predetermined said symbols; said type rings having a selecting position in which they are spaced relatively far apart and can be rotated independently of each other for selecting said selected symbols; said type rings having a type ring printing position in which they are disposed relatively close together for printing;
   a stopper member supported on said printing head and having a protruding position in which it engages said machine frame to prevent said printing head from being moved to said printing head printing position; said stopper member having a retracted position in which it does not engage said machine frame and does not prevent said printing head from being moved into said printing head printing position; said stopper member having a projecting cam follower formed thereon;
   a cam member having a cam surface against which said projecting cam follower is biased, said cam member being generally circular in shape and having a diameter approximately equal to or less than the diameter of said type rings and being coaxial with said type rings; said cam member being rotatable between first and second cam positions, wherein said first cam position corresponds to said selecting position of said type ring and to said protruding position of said stopper means, and said second cam position corresponds to said type ring printing position and to said retracted position of said stopper means;
   said cam member having a first groove formed in said cam surface which receives said cam follower when said cam member is in said second cam position, said stopper member being in said retracted position when said cam follower is received in said first groove; said cam member also having a second groove formed in said cam surface which is shallower than said first groove and which receives said cam follower when said cam member is in said first cam position, said stopper member being in said protruding position when said cam follower is received in said second groove;
   moving means for moving said type rings between said selecting position and said type ring printing position;
   said cam member cooperating with said moving means to move said stopper member from said protruding position to said retracted positon when said moving means moves said type rings to said type ring printing position.

2. The device of claim 1, in which said type rings are for printing bar code symbols.

3. The device of claim 1, wherein said printing head further comprises a casing and in which said stopper member is pivotally secured to said casing.

4. The device of claim 3, in which said cam follower is biased against said cam surface by a spring.

5. The device of claim 1, in which said moving means comprises a thrust member accommodated in said casing, said thrust member being movable between a third and fourth position corresponding respectively to said first and second cam positions; said thrust member exerting a force on said type rings when it is in said third position to force said type rings into said type ring printing position.

6. The device of claim 5, in which said moving means further comprises an actuating member for moving said thrust member between said third and fourth positions.

7. The device of claim 6, in which said actuating member and said thrust member have respective slopes which engage each other when said thrust member is in said third position.

8. The device of either of claims 1 or 6, in which said moving means includes a selecting shaft for rotating said cam member between said first and second cam positions.

9. The device of claim 8, in which said selecting shaft is also for rotating a selected said type ring independently of the other said type rings when said type rings are in said selecting position.

* * * * *